(12) United States Patent
Harada

(10) Patent No.: US 8,290,283 B2
(45) Date of Patent: *Oct. 16, 2012

(54) IMAGE PROCESSING DEVICE AND IMAGE READING DEVICE CAPABLE OF PERFORMING ENCODING PROCESSING FOR COMPRESSING MULTILEVEL IMAGE DATA AND ENCODING PROCESSING FOR COMPRESSING BINARY IMAGE DATA

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 973 days.

This patent is subject to a terminal disclaimer.

(21) Appl. No.: 12/335,805

(22) Filed: Dec. 16, 2008

(65) Prior Publication Data

US 2009/0161970 A1 Jun. 25, 2009

(30) Foreign Application Priority Data

Dec. 25, 2007 (JP) ................... 2007-333042

(51) Int. Cl.
*G06K 9/36* (2006.01)
*G06F 3/041* (2006.01)
*G06K 9/46* (2006.01)

(52) U.S. Cl. ........................................ 382/232; 345/173

(58) Field of Classification Search .................. 382/232, 382/233, 239, 240, 283; 358/1.1, 1.13, 1.15, 358/448, 505, 515; 345/173, 467; 715/234, 715/239, 243, 254, 273

See application file for complete search history.

(56) References Cited

U.S. PATENT DOCUMENTS

| 5,023,611 A * | 6/1991 | Chamzas et al. ................ 341/51 |
| 7,904,811 B2 * | 3/2011 | Saito ............................. 715/273 |
| 8,085,446 B2 * | 12/2011 | Harada ..................... 358/426.06 |
| 2005/0219556 A1 | 10/2005 | Lee et al. |
| 2006/0132855 A1 * | 6/2006 | Dokuni et al. ................ 358/448 |
| 2007/0070463 A1 | 3/2007 | Moro |
| 2007/0262992 A1 * | 11/2007 | Ito ................................. 345/467 |
| 2008/0159650 A1 * | 7/2008 | Odamaki ..................... 382/283 |
| 2009/0161970 A1 * | 6/2009 | Harada ........................ 382/232 |

FOREIGN PATENT DOCUMENTS

| CN | 1677385 A | 10/2005 |
| JP | 11-155045 | 6/1999 |
| JP | 2003-51951 | 1/2003 |
| JP | 2007-97169 | 4/2007 |

* cited by examiner

*Primary Examiner* — Amir Alavi
(74) *Attorney, Agent, or Firm* — Gerald E. Hespos; Michael J. Porco

(57) ABSTRACT

An image processing device includes an input portion for selecting encoding processing for an image to be filed as a monochrome image from first encoding processing according to a first compression method for compressing multilevel image data and second encoding processing according to a second compression method for compressing binary image data. An encoding processing portion performs encoding processing on the image to be filed as the monochrome image. The input portion includes a display and first and second input portions. The display displays a list of images to be filed as the monochrome image. The first input portion is used to specify an image shown on the display and to select encoding processing to be performed on the specified image. The second input portion is used to select the first or second encoding processing to be performed on the specified image.

14 Claims, 14 Drawing Sheets

IMAGE PROCESSING DEVICE AND IMAGE READING DEVICE CAPABLE OF PERFORMING ENCODING PROCESSING FOR COMPRESSING MULTILEVEL IMAGE DATA AND ENCODING PROCESSING FOR COMPRESSING BINARY IMAGE DATA

BACKGROUND OF THE INVENTION

1. Field of the Invention

The present invention relates to an image processing device capable of performing encoding processing according to a compression method for compressing multilevel image data and encoding processing according to a compression method for compressing binary image data, and to an image reading device equipped with the image processing device.

2. Description of the Related Art

There is a color digital copying machine furnished with a technique of automatically determining whether an image read by the image reading portion is a monochrome (black and white) image or a color image by the ACS (Auto Color Selection) processing (for example, JP-A-11-155045). Further, there is a copying machine furnished with a capability of enabling the user to select whether the encoding processing by the MMR (Modified Modified Read) (ITU-T T.6) compression method for compressing binary image data or the encoding processing by the JPEG (Joint Photographic Experts Group) compression method for compressing multilevel image data is to be performed when the image is determined as being a monochrome image from the result of the ACS processing in a case where the copying machine transmits the image data to an external device (for example, a personal computer, hereinafter abbreviated as PC), and this copying machine is now available in the market.

Meanwhile, when red and black are the colors of a two-color document, the document is not determined as being a two-color document by the ACS processing. This poses a problem that although the document is a two-color document, processing in the ACS mode is performed in the same manner as in the full-color mode. In order to solve this problem, JP-A-2007-97169 discloses a technique to determine whether a document is a full color document, a black document, or a two-color document on the basis of color information of the image data using histogram information and color difference level information, so that image processing is performed according to the determination result.

Incidentally, for the copying machine furnished with the capability of enabling the user to select the type of encoding processing in a case where the image is a monochrome image, there has been an increasing need to improve the convenience of the encoding processing type selecting capability.

SUMMARY OF THE INVENTION

The invention was devised to solve the problems discussed above and has an object to provide a technique of improving the convenience of an image processing device capable of performing encoding processing according to a compression method for compressing multilevel image data and encoding processing according to a compression method for compressing binary image data, and the convenience of an image reading device equipped with the image processing device.

An image processing device according to one aspect of the invention includes: an input operation portion that is used to make an input for selecting encoding processing to be performed on an image to be filed as a monochrome image from first encoding processing according to a first compression method for compressing multilevel image data and second encoding processing according to a second compression method for compressing binary image data; an encoding processing portion that performs the encoding processing inputted from the input operation portion on the image upon input of the encoding processing to be performed on the image to be filed as the monochrome image from the input operation portion; and a file creating portion that creates a file of image data after the encoding processing by the encoding processing portion. The input operation portion includes a display portion and first and second input portions. The display portion displays a list display screen on which images to be filed as the monochrome image are shown in a form of a list. The first input portion is used to make an input for specifying a desired image among the images shown on the display portion. The display portion displays an input screen on which is made an input for selecting encoding processing to be performed on an image specified by the first input portion from the first and second encoding processing. The second input portion is used to make an input on the input screen for selecting one of the first and second encoding processing as the encoding processing to be performed on the image specified by the first input portion.

According to this configuration, the list display screen showing images to be filed as the monochrome image in the form of a list is displayed on the display portion so as to enable the user to make an input for specifying a desired image among the images shown on the list display screen. Hence, in comparison with a case where the list display screen is not displayed, the encoding processing to be performed on the desired image can be selected swiftly. It thus becomes possible to achieve an image processing device having high convenience.

Consequently, it becomes possible to improve the convenience of an image processing device capable of performing encoding processing according to a compression method for compressing multilevel image data and encoding processing according to a compression method for compressing binary image data, and the convenience of an image reading device equipped with the image processing device.

DETAILED DESCRIPTION OF THE PREFERRED EMBODIMENTS

Figure 1:
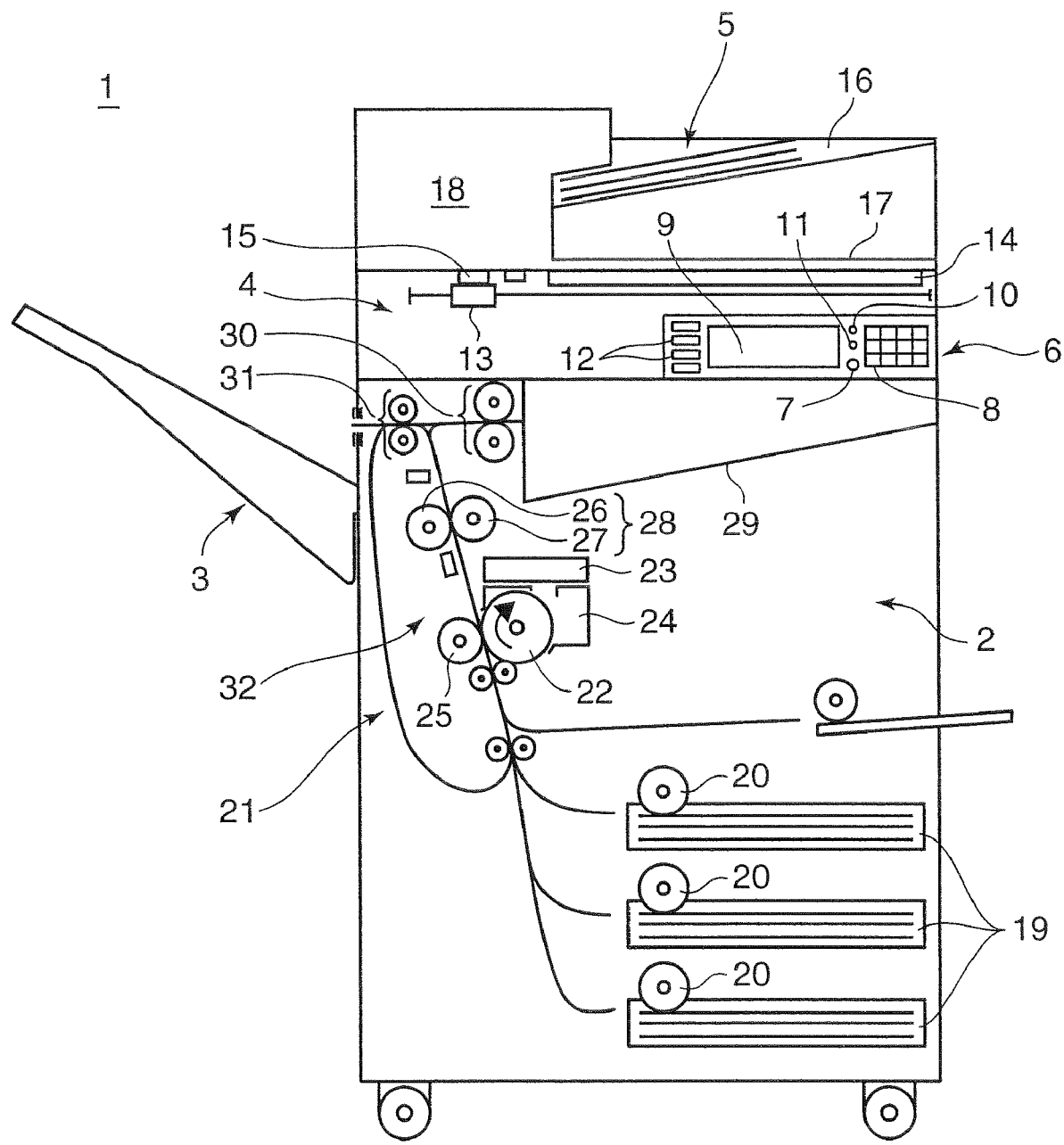
FIG. 1 is a side view schematically showing the inner configuration of a complex machine as an example of an image forming device according to one embodiment of the invention.

Hereinafter, a complex machine, which is an example of an image forming device of the invention, will be described with reference to the drawings as a first embodiment. FIG. 1 is a side view schematically showing the inner structure of the complex machine. A complex machine 1 is furnished with capabilities of functioning as a copying machine, a printer, a scanner, a facsimile machine, and so forth. The complex machine 1 includes a main body portion 2, a stack tray 3 provided on the left side of the main body portion 2, a document reading portion 4 provided on the top of the main body portion 2, and a document feeding portion 5 provided above the document reading portion 4.

An operation portion 6 is provided at the front of the complex machine 1. The operation portion 6 includes a start key 7 for enabling the user to input a print execute command, a numerical keypad 8 used to input the number of print copies, a display portion 9 formed of a liquid crystal display or the like to display operation guide information about various copying operations and having a touch panel used to input various settings, a reset key 10 to reset the content of the setting made on the display portion 9, a stop key 11 to stop a print (image forming) operation being executed, a function switching key 12 to switch the complex machine 1 to function as a copying machine, a printer, a scanner, or a facsimile machine.

When the user touches the display screen on the display portion 9, the touch panel accepts information represented by an image shown at the touched position. Accordingly, when the user operates (touches) images, such as buttons and icons shown on the display portion 9, an operation instruction correlated with the touched image is accepted by the display portion 9.

Figure 2:
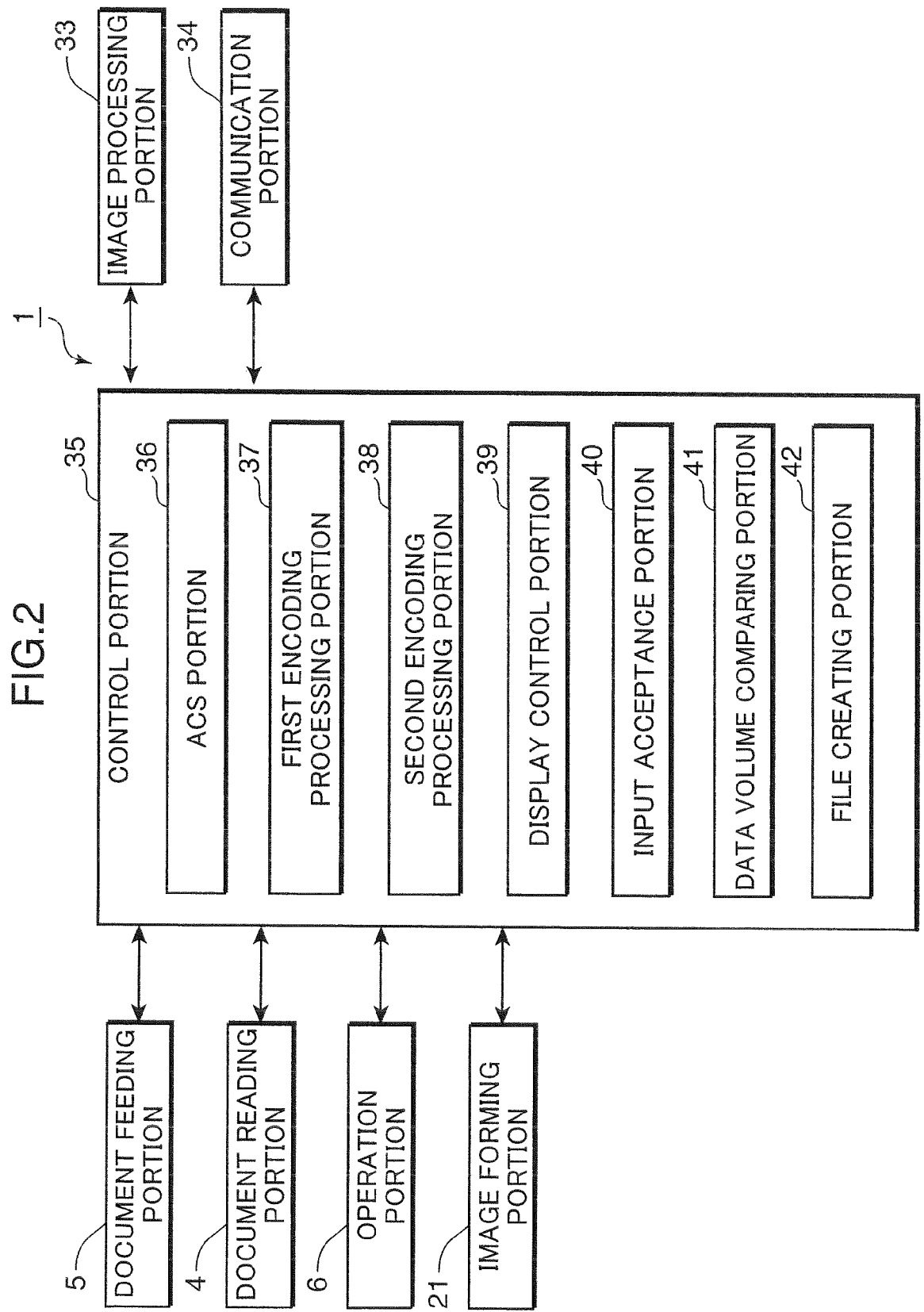
FIG. 2 is a block diagram showing the electrical configuration of the complex machine.

The document reading portion 4 includes a scanner portion 13 formed of a CCD (Charge Coupled Device) sensor, an exposure lamp, and the like, a document table 14 formed of a transparent member, such as glass, and a document reading slit 15. The scanner portion 13 is formed to be movable by an unillustrated drive portion. When reading a document placed on the document table 14, the scanner portion 13 is moved along the document surface at a position opposing the document table 14 to scan the document image, and outputs the image data thus obtained to a control portion 35 (FIG. 2). When reading a document fed from the document feeding portion 5, the scanner portion 13 is moved to a position opposing the document reading slit 15 and obtains the document image in synchronization with a transportation operation of the document by the document feeding portion 5 via the document reading slit 15, and outputs the image data to the control portion 35.

The document feeding portion 5 includes a document placement portion 16 on which to place a document, a document discharge portion 17 on which to discharge a document after the image has been read, and a document transportation mechanism 18 formed of a paper feeding roller and a transportation roller (neither is shown) to pick up the documents placed on the document placement portion 16 one by one so as to transport the document to the position opposing the document reading slit 15 and to discharge the document to the document discharge portion 17. The document transportation mechanism 18 further includes a document inversion mechanism (not shown) to reverse the document and transport the inverted document again to the position opposing the document reading slit 15. It is therefore possible to read the images on the both sides of the document by the scanner portion 13 via the document reading slit 15.

The document feeding portion 5 is provided to be rotatable with respect to the main body portion 2 so that the front face side is allowed to move upward. By opening the top face of the document table 14 by moving the front face side of the document feeding portion 5 upward, the operator becomes able to place a document to be read, for example, a two-page spread book, on the top face of the document table 14.

The main body portion 2 includes a plurality of paper feeding cassettes 19, paper feeding rollers 20 to pick up recording sheets from the corresponding paper feeding cassettes 19 one by one so as to transport the recording sheet to an image forming portion 21, and the image forming portion 21 that forms an image on the recording sheet transported from any one of the paper feeding cassettes 19.

The image forming portion 21 includes an optical unit 23 that exposes a photoconductive drum 22 to light by outputting a laser beam or the like according to the image data obtained in the scanner portion 13, a developing portion 24 that forms a toner image on the photoconductive drum 22, a transfer portion 25 that transfers the toner image on the photoconductive drum 22 onto a recording sheet, a fixing device 28 formed of a pair of rollers 26 and 27 that heats the recording sheet bearing the toner image to fix the toner image on the recording sheet, transportation roller pairs 30 and 31 that are provided in a sheet transportation path inside the image forming portion 21 to transport the recording sheet to a stack tray 3 or a discharge tray 29.

In a case where images are to be formed on the both sides of a recording sheet, after the image is formed on one side of the recording sheet in the image forming portion 21, the recording sheet is nipped by the transportation roller pair 30 on the discharge tray 29 side. The transportation roller pair 30 is rotated backward in this state so that the recording sheet is switched back. The recording sheet is then sent to a sheet transportation path 32 and transported again upstream of the image forming portion 21. After the image is formed on the other side in the image forming portion 21, the recording sheet is discharged to the stack tray 3 or the discharge tray 29.

FIG. 2 is a block diagram showing the electrical configuration of the complex machine 1. Like components are labeled with like reference numerals with respect to FIG. 1 and detailed descriptions of such components are omitted.

The complex machine 1 is formed by including a document reading portion 4, a document feeding portion 5, an operation portion 6, an image forming portion 21, an image processing portion 33, a communication portion 34, and a control portion 35. The document reading portion 4, the document feeding portion 5, the operation portion 6, and the image forming portion 21 correspond to the counterparts shown in FIG. 1.

The image processing portion 33 performs various types of image processing on the image data. For example, the image processing portion 33 performs image processing including corrections, such as the level correction and the gamma correction, compression and decompression of image data, and scaling up and down of image data on the image data obtained by the image reading portion 4 or the image data transferred through the communication portion 34 from a personal computer connected via a network, a facsimile machine connected via a public line, or the like.

The communication portion 34 enables various types of data transmission and reception with an external device, such as a computer and a facsimile machine, connected via a network using a network interface. The communication portion 34 transmits a data file created by a file creating portion 42 described below, that is, compressed image data, to the external device connected via a network. In this case, because the traffic in the network increases as the size of the data file becomes larger, it is more preferable that the size of a data file becomes smaller.

The control portion 35 is responsible for the control on the overall operations of the complex machine 1, and is formed of a CPU or the like. The document reading portion 4, the document feeding portion 5, the operation portion 6, the image forming portion 21, the image processing portion 33, and the communication portion 34 operate under the control of the control portion 35. The control portion 35 not only controls the complex machine 1 systematically by performing processing according to the operation control program pre-installed in unillustrated ROM (Read Only Memory) or HDD (Hard Disk Drive) in response to various instruction signals inputted into the operation portion 6 by the user to output instruction signals or transfer data to the respective functional portions, but also operates as the respective functional portions as will be described below.

In a case where a file of image data obtained by a reading action of the document reading portion 4 is created and transmitted to a computer or the like connected to the complex machine 1, in order to achieve a capability of enabling this filing operation, the control portion 35 includes an ACS portion 36 (determination portion), a first encoding processing portion 37, a second encoding processing portion 38, a display control portion 39, an input acceptance portion 40, a data volume comparing portion 41, and a file creating portion 42. It should be noted that the respective functional portions of the control portion 35 may be achieved by a circuit, for example, an ASIC (Application Specific Integrated Circuit).

The ACS portion 36 determines whether an image of each page read by the document reading portion 4 is a monochrome (black and white) image or a color image. The ACS determination by the ACS portion 36 is performed, for example, as follows.

Initially, the ACS portion 36 determines whether pixels forming the image data read by the document reading portion 4 are color pixels or black and white pixels on a pixel-by-pixel basis. Because this determination method is a known method used to determine whether the respective pixels forming the image data are color pixels or black and white pixels on the basis of the RGB values of the image data, a chroma difference (color difference) between a target pixel for determination and the neighboring pixels, and the like, a detailed description is omitted herein. Upon determining that the target pixel is a color pixel by the determination described above, the ACS portion 36 counts up the number of color pixels for the document. When the counted number of color pixels reaches the pre-set threshold value, the ACS portion 36 determines the read image of the document as being a color image. Upon determining that the number of color pixels does not reach the threshold value by continuing to count on the assumption that all the rest of the pixels, which are target pixels to be determined as being a color pixel or a monochrome pixel, are color pixels, the ACS portion 36 determines the read image of the document as being a monochrome image at this point in time. It should be appreciated that the ACS determination processing as above is a mere example and the ACS determination by the ACS portion 36 is not limited to this processing.

The first encoding processing portion 37 performs encoding processing by the JPEG compression method on image data forming a color image and a monochrome image. The second encoding processing portion 38 performs encoding processing by the MMR compression method on image data forming a monochrome image. Alternatively, the second encoding processing portion 38 may perform encoding processing by the JBIG (Joint Bi-level image experts Group) compression method used to compress, for example, binary image data.

The display control portion 39 displays an input screen on the display portion 9 as will be described below when a monochrome image is detected by the ACS portion 36. FIG. 3 through FIG. 10 are views showing respectively input screens G1 through G8 displayed on the display portion 9.

Figure 3:
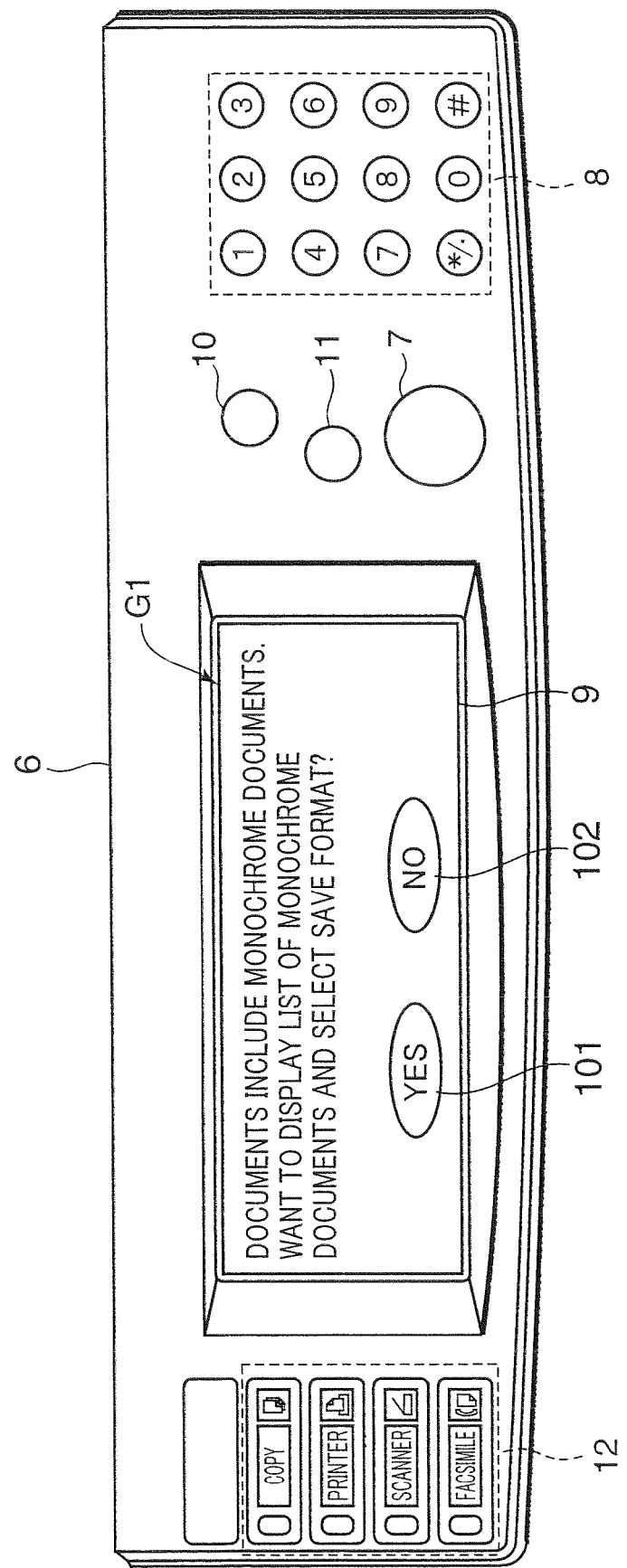
FIG. 3 is a view showing the flowchart of image processing by a control portion.

FIG. 3 is an example of the input screen G1 displayed on the display portion 9 by the display control portion 39 when a monochrome image is detected by the ACS portion 36. On the input screen G1 are displayed a message informing that documents include monochrome documents and a YES button 101 and a NO button 102 for the user to select whether he wishes a list of monochrome images to be displayed. The YES button 101 is a button to make an input for executing the display of a list of monochrome images. The NO button 102 is a button to make an input for not executing the display of a list of monochrome images.

Figure 4:
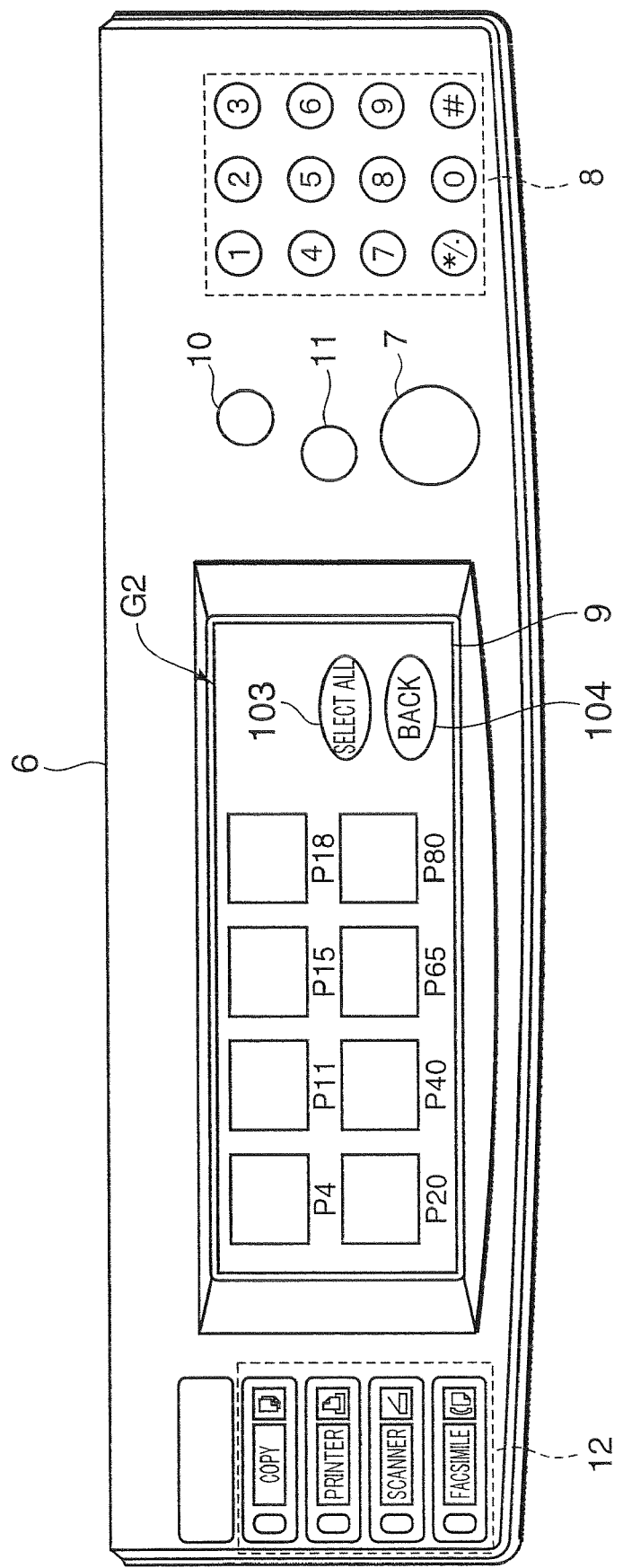
FIG. 4 is a view showing an example of an input screen for the user to make an input for setting the type of encoding processing by which to generate image data to be filed.

When an operation is made on the YES button 101 on the input screen G1, the input screen G2 as shown in FIG. 4 is displayed by the display control portion 39. On the input screen G2 are displayed a list display screen, which is a list of reduced images of monochrome documents detected by the ACS portion 36, and a Select All button 103, and a Back button 104. FIG. 4 shows an input screen in a case where, for example, the fourth, eleventh, fifteenth, eighteenth, twentieth, fortieth, sixty-fifth, and eightieth pages in a pile of one hundred documents are monochrome documents. The respective reduced images are displayed so that each can be selected individually. Herein, the list display screen and the Select All button 103 correspond to an example of a first input portion.

The Select All button 103 is a button to select a save format for images of all the monochrome documents collectively. The Back button 104 is a button to display the input screen G1 shown in FIG. 3 again. The save format specifies by which compression method the image data to be saved is compressed and it corresponds to the compression method. Generally, the expression, "save format" and the name of the save format corresponding to the compression method are easier for the user to understand than the expression, "compression method" and the name of the compression method. For this reason, the expression, "save format", and the name of the save format are displayed on the input screens G1 through G8 shown in FIGS. 3 through 10, respectively.

Figure 5:
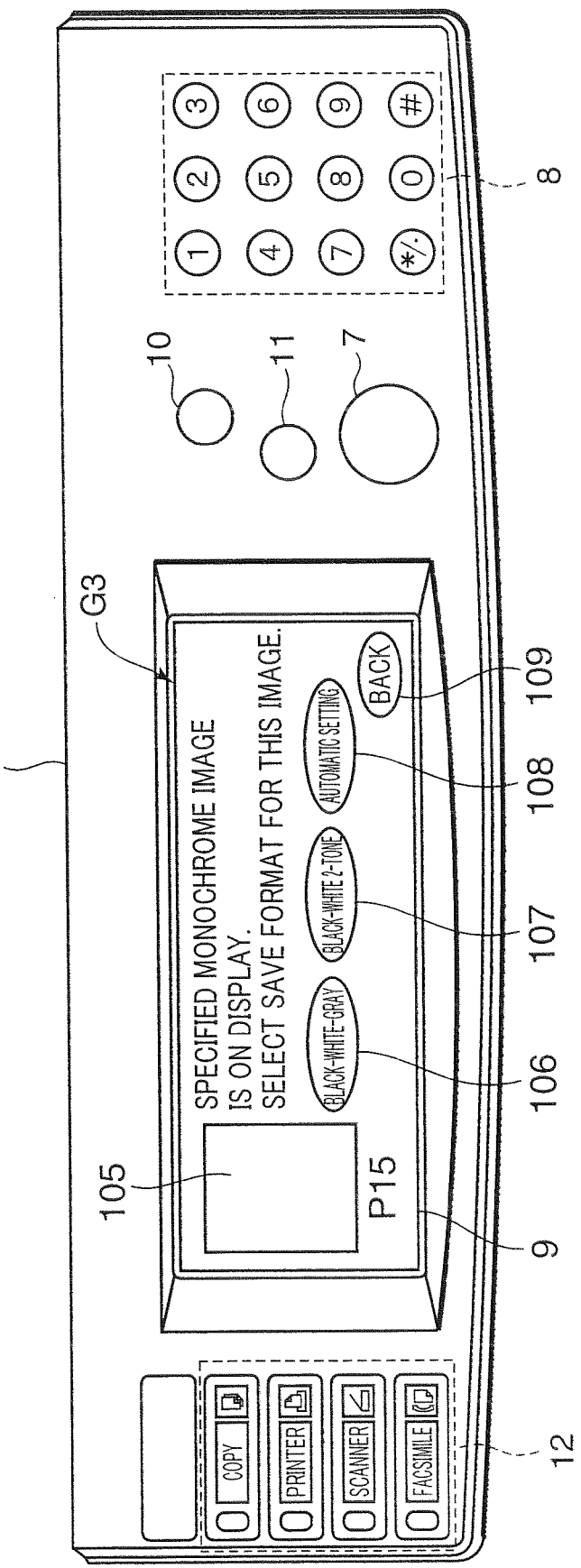
FIG. 5 is a view showing another example of the input screen for the user to make an input for setting the type of encoding processing by which to generate image data to be filed.

On the input screen G2, when the user touches, for example, the reduced image (P15) of the fifteenth page, an operation for the reduced image of the monochrome document at the fifteenth page is accepted by the input acceptance portion 40. The input screen G3 as shown in FIG. 5 is then displayed by the display control portion 39. On the input screen G3 are displayed a reduced image 105 of the monochrome document slightly larger than the reduced image shown in FIG. 4, a message informing that the reduced image 105 is on display and asking the user in which save format he wishes to save the reduced image 105, a Black-White-Gray button 106 (a first button), a Black-White 2-Tone button 107 (a second button), an Automatic Setting button 108 (a third button), and a Back button 109. In this case, the Black-White-Gray button 106 and the Black-White 2-Tone button 107 correspond to an example of a second input portion, and the Automatic Setting button 108 corresponds to an example of a third input portion.

The Black-White-Gray button 106 is a button to input a provisional instruction to perform encoding processing by the JPEG compression method on the image data of the monochrome image being displayed on the input screen G3. The Black-White 2-Tone button 107 is a button to input a provisional instruction to perform encoding processing by the MMR compression method on the image data of the monochrome image being displayed on the input screen G3. The Automatic Setting button 108 is a button to input an instruction to make the complex machine 1 select the save format (the type of encoding processing and the compression method) for the image data of the monochrome image being displayed on the input screen G3 and perform the encoding processing corresponding to the type of save format it has selected. The Back button 109 is a button to display the input screen G2 shown in FIG. 4 again.

Figure 6:
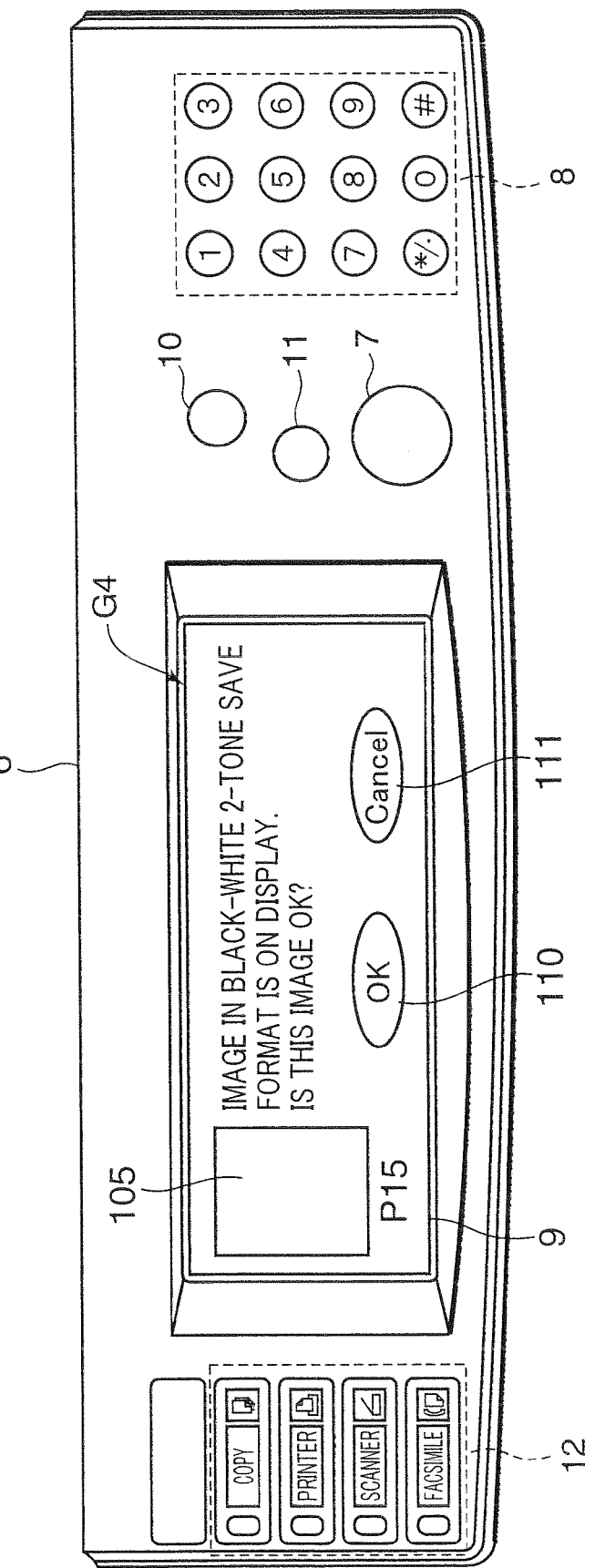
FIG. 6 is a view showing still another example of the input screen for the user to make an input for setting the type of encoding processing by which to generate image data to be filed.

When an operation is made on the Black-White 2-Tone button 107 on the input screen G3, the input screen G4 as shown in FIG. 6 is displayed on the display portion 9 by the display control portion 39. On the input screen G4 are displayed the reduced image 105, which is the monochrome image displayed on the input screen G3 shown in FIG. 5 after the encoding processing by the MMR compression method, a message requesting the user to confirm again whether the instruction to perform the encoding processing by the MMR compression method is suitable, an OK button 110, and a Cancel button 111.

The OK button 110 is a button to input a final instruction to perform the encoding processing by the MMR compression method. The Cancel button 111 is a button to input an instruction to display the input screen G3 shown in FIG. 5 again.

Figure 7:
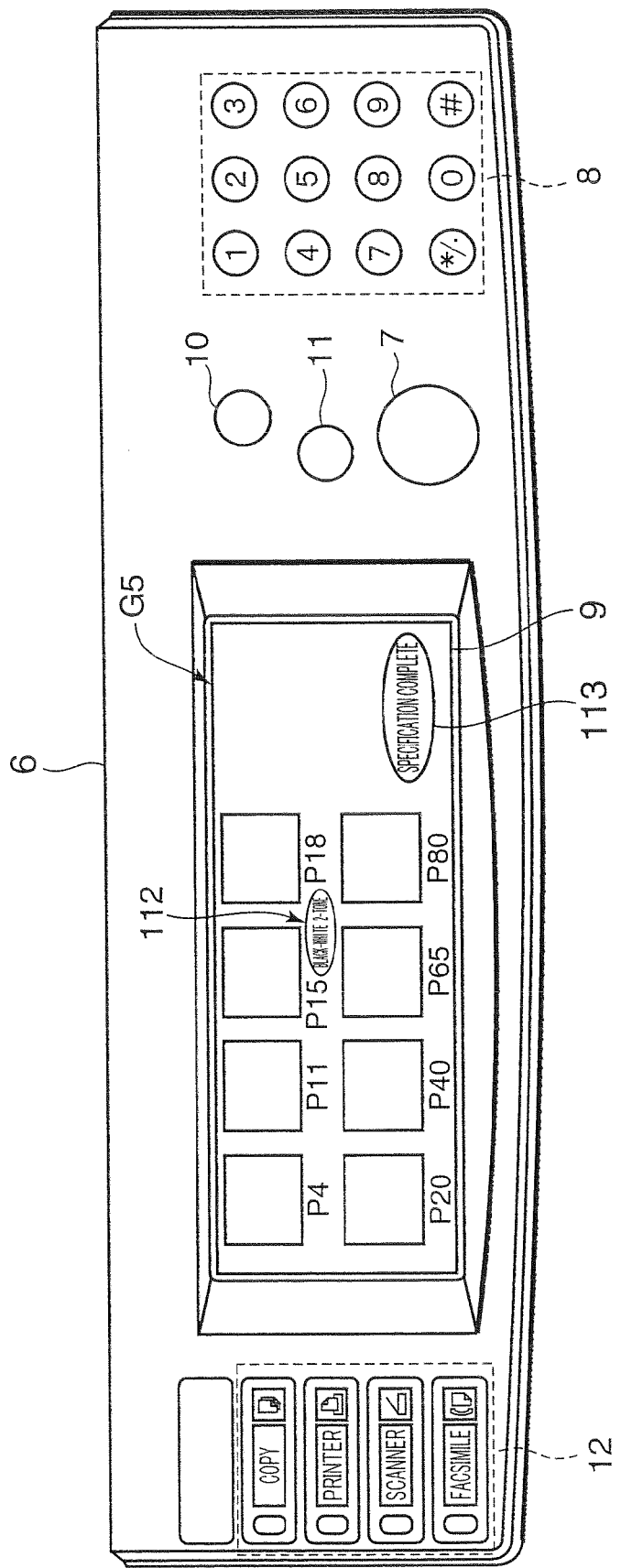
FIG. 7 is a view showing still another example of the input screen for the user to make an input for setting the type of encoding processing by which to generate image data to be filed.

When an operation is made on the OK button 110, the input screen G5 as shown in FIG. 7 is displayed by the display control portion 39. On the input screen G5 are displayed a list of reduced images same as the one on the input screen G4 shown in FIG. 4 and a Specification Complete button 113. On the input screen image G5, a name display portion 112 to indicate the name of the save format is provided in the vicinity of the monochrome image for which the save format is specified, so that the user is able to confirm at a glance which save format he has selected as the save format in which to save the image data of the respective monochrome images. The Specification Complete button 113 is a button to input an instruction to end the selection of the save format in which to save the image data of the monochrome images.

Figure 8:
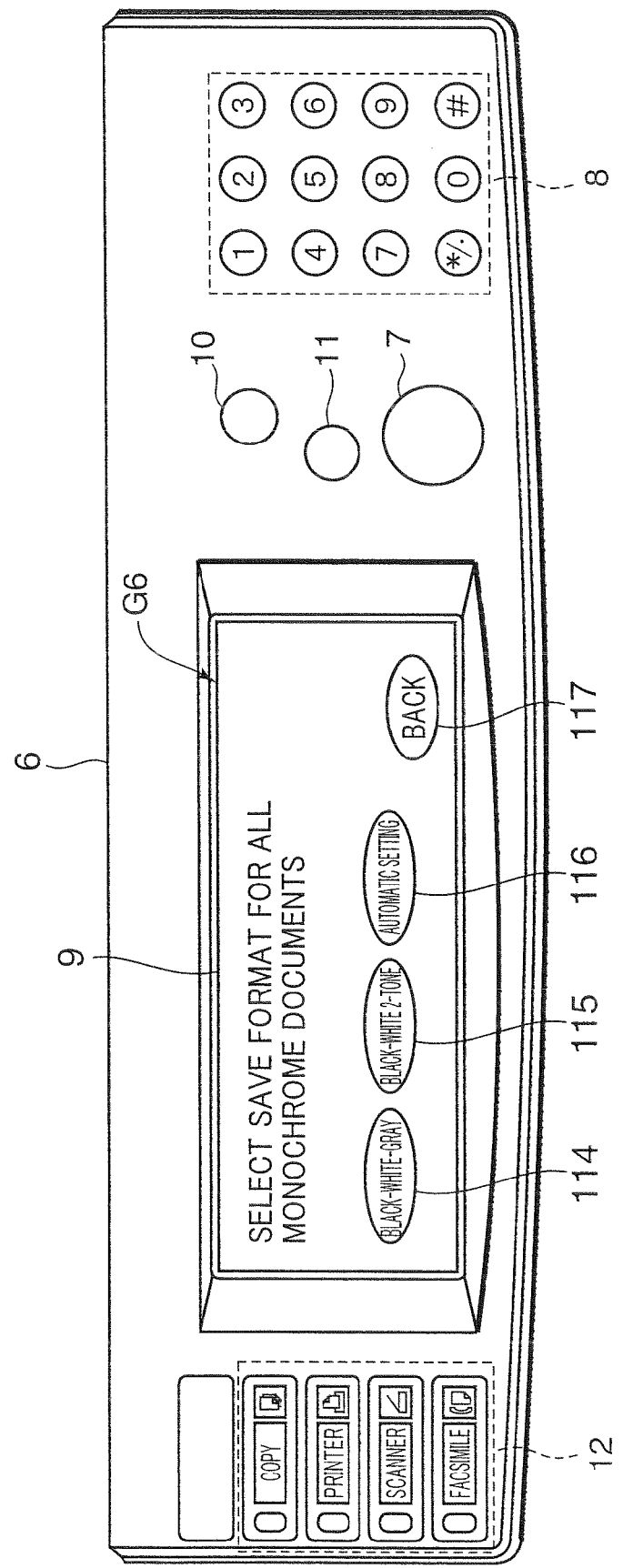
FIG. 8 is a view showing still another example of the input screen for the user to make an input for setting the type of encoding processing by which to generate image data to be filed.

Meanwhile, when an operation is made on the Select All button 103 on the input screen G2 shown in FIG. 4, the input screen G6 as shown in FIG. 8 is displayed by the display control portion 39. On the input screen G6 are displayed a message asking the user in which save format he wishes to save all the monochrome images, a Black-White-Gray button 114, a Black-White 2-Tone button 115, an Automatic Setting Button 116, and a Back button 117. The functions of the respective buttons 114 through 117 are almost the same as those of the respective buttons 106 through 109 shown in FIG. 5, and descriptions of these buttons are omitted herein.

Figure 9:
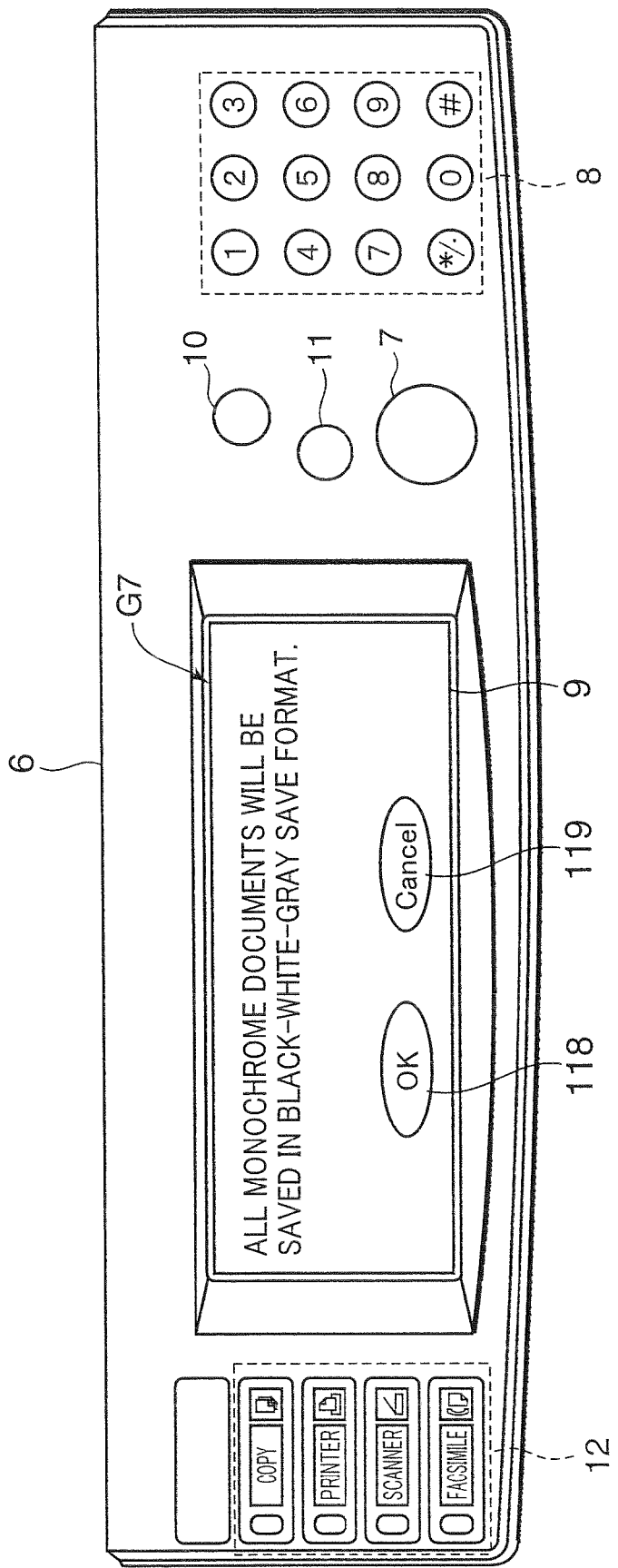
FIG. 9 is a view showing still another example of the input screen for the user to make an input for setting the type of encoding processing by which to generate image data to be filed.
Figure 10:
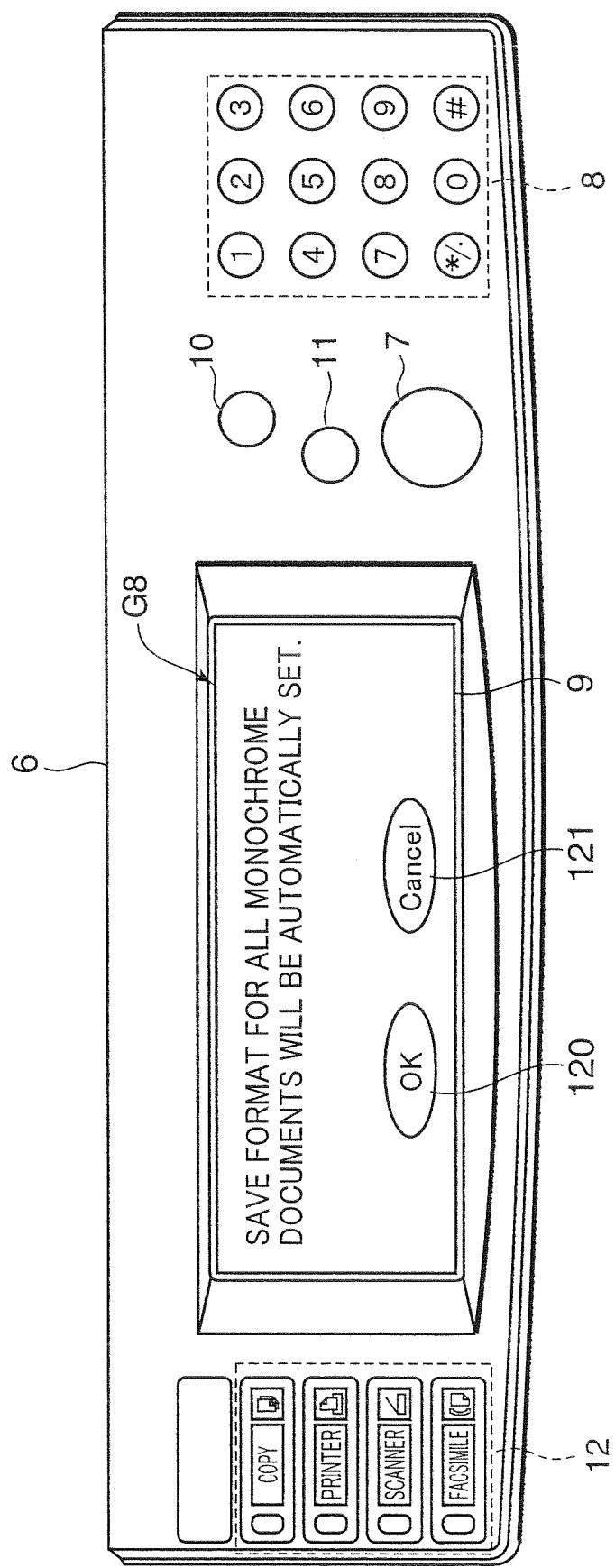
FIG. 10 is a view showing still another example of the input screen for the user to make an input for setting the type of encoding processing by which to generate image data to be filed.

When an operation is made on the Black-White-Gray button 114 or the Black-White 2-Tone button 115, the input screen G7 as shown in FIG. 9 is displayed by the display control portion 39. When an operation is made on the Automatic Setting button 116, the input screen G8 as shown in FIG. 10 is displayed. On the input screens G7 and G8 shown respectively in FIG. 9 and FIG. 10 are displayed, messages requesting the user to confirm again whether the type of the save format corresponding to the operated button is suitable, OK buttons 118 and 120, and Cancel buttons 119 and 121.

When an operation is made on the OK button 118 or 120, encoding processing corresponding to the save format selected on the input screen G6 shown in FIG. 8 is performed. When an operation is made on the Cancel button 119 or 121, the input screen G6 shown in FIG. 8 is displayed again.

Referring to FIG. 2 again, when operations are made on the input screens G1 through G8 shown in FIG. 3 through FIG. 10, respectively, the input acceptance portion 40 accepts these operations and outputs instructions to perform processing corresponding to the operations to the first encoding processing portion 37, the second encoding processing portion 38, the display control portion 39, the data volume comparing portion 41, and the file creating portion 42. In this case, the operation portion 6, the display control portion 39, and the input acceptance portion 40 together form an example of the input operation portion.

When an input for automatically setting the save format is made on the input screen G3 shown in FIG. 5 or the input screen G6 shown in FIG. 8, the data volume comparing portion 41 compares a data volume of the image data after the encoding processing by the JPEG method by the first encoding processing portion 37 and a data volume of the image data after the encoding processing by the MMR compression method by the second encoding processing portion 38 as to which data volume is larger than the other. The data volume comparing portion 41 functions also as a selection processing portion.

The file creating portion 42 creates a file of the image data after the encoding processing by the first and second encoding processing portions 37 and 38.

To be more concrete, in a case where the ACS portion 36 determines the image as being a monochrome image, when the user selects the save format, the file creating portion 42 creates a file of the image data after the encoding processing corresponding to the selected save format. In other words, when the user selects "Black-White-Gray", the file creating portion 42 creates a file of the image data after the encoding processing by the JPEG compression method, and when the user selects "Black-White 2-Tone", it creates a file of the image data after the encoding processing by the MMR compression method.

In addition, in a case where the ACS portion 36 determines the image as being a monochrome image, when the user makes an input for automatically setting the save format, the file creating portion 42 determines the image data to be filed and the save format according to the comparison result of the data volume comparing portion 41 and creates a file of the image data.

More specifically, when the data volume comparing portion 41 determines that a data volume of the image data after the encoding processing by the MMR compression method by the second encoding processing portion 38 is smaller than a data volume of the image data after the encoding processing by the JPEG compression method by the first encoding processing portion 37, the file creating portion 42 creates a data file of the image data after the encoding processing by the MMR compression method by the second encoding processing portion 38. When the data volume comparing portion 41 determines that a data volume of the image data after the encoding processing by the MMR compression method by the second encoding processing portion 38 is larger than a data volume of the image data after the encoding processing by the JPEG compression method by the first encoding processing portion 37, the file creating portion 42 creates a data file of the image data after the encoding processing by the JPEG compression method by the first encoding processing portion 37.

In a case where a data volume of the image data after the encoding processing by the MMR compression method by the second encoding processing portion 38 and a data volume of the image data after the encoding processing by the JPEG compression method by the first encoding processing portion 37 are found to be equal from the comparison result of the data volume comparing portion 41, the file creating portion 42 creates a file of the image data after the encoding processing by the JPEG compression method by the first encoding processing portion 37 in this embodiment.

Further, in a case where the ACS portion 36 determines the image as being a color image, the file creating portion 42 creates a file of the image data after the encoding processing by the JPEG compression by the first encoding processing portion 37.

Figure 11:
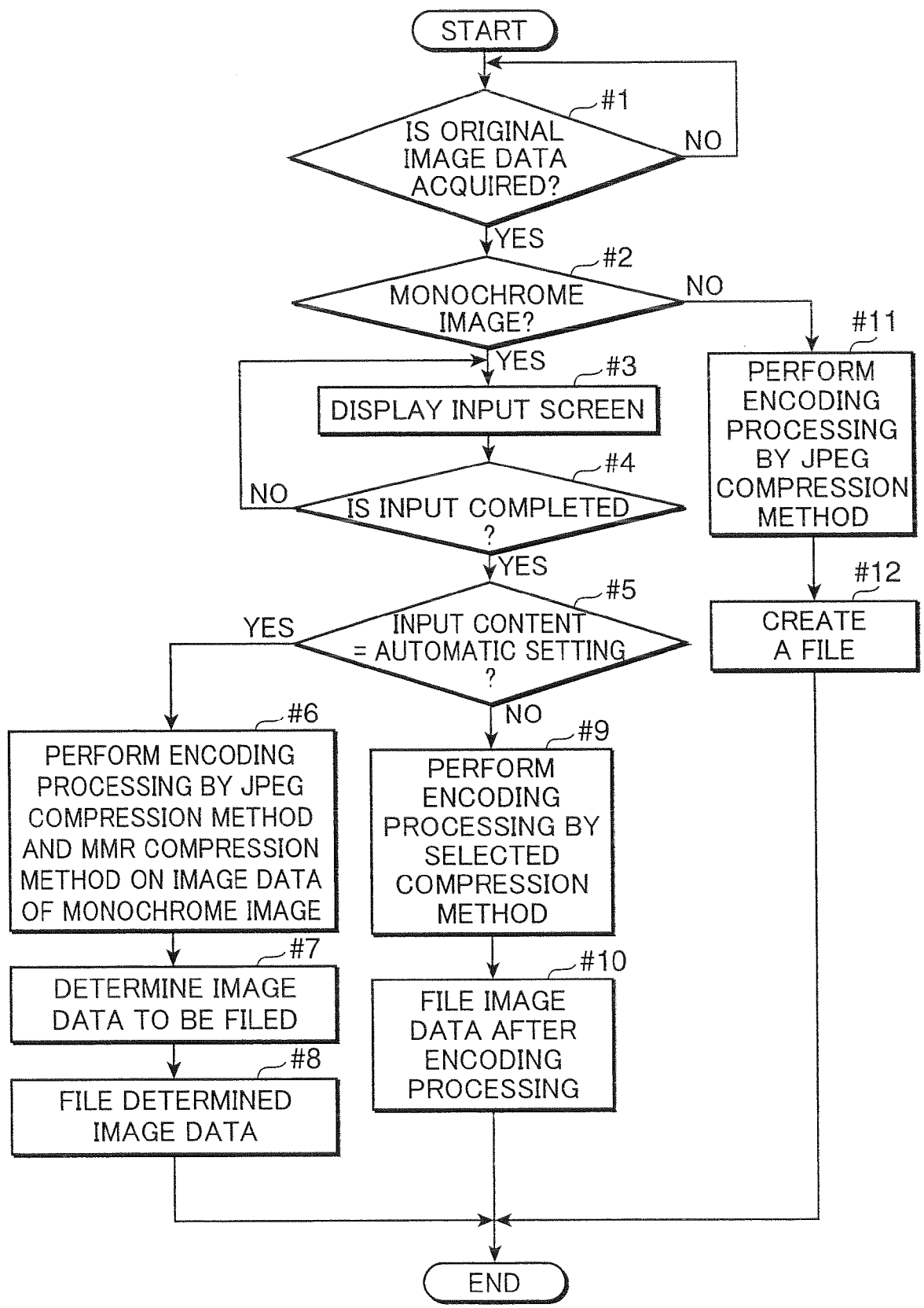
FIG. 11 is a flowchart of the processing relating to creation of a file of the image data by the control portion.

FIG. 11 is a view showing the flowchart of the processing relating to the filing of the image data by the control portion 35. Hereinafter, descriptions will be given on the assumption that the save format is set individually for the image data of the respective documents.

As is shown in FIG. 11, upon acquisition of the image data (original image data) obtained by a reading action of the document reading portion 4 (YES in Step #1), the control portion 35 (ACS portion 36) determines whether the image made up of the original image data is a monochrome image (Step #2). In a case where the control portion 35 (ACS portion 36) determines the image as being a monochrome image (YES in Step #2), the display control portion 39 displays the input screens G1 through G8 on the display portion 9 as needed (Step #3).

When inputs on the input screens G1 through G8 are completed and the input operations are accepted by the input acceptance portion 40 (YES in Step #4), the control portion 35 (input acceptance portion 40) determines whether the contents of the inputs are to set the save format automatically (Step #5). Upon determining that the contents of the accepted inputs are to set the save format automatically (YES in Step #5), the control portion 35 (input acceptance portion 40) controls the first encoding processing portion 37 to perform encoding processing according to the JPEG compression method on the image data forming the monochrome image and controls the second encoding processing portion 38 to perform encoding processing according to the MMR compression method on the image data (Step #6). Then, the data volume comparing portion 41 compares a data volume of the image data after the encoding processing according to the JPEG compression method and a data volume of the image data after the encoding processing according to the MMR compression method as to which data volume is larger than the other, and selects the image data having the smaller data volume from the two types of image data as the image data to be filed according to the comparison result (Step #7). Further, the file creating portion 42 creates a data file of the image data compressed by the compression method selected by the data volume comparing portion 41 (Step #8).

Meanwhile, in a case where it is determined in Step #5 that the contents of the inputs accepted at the input acceptance portion 40 are to specify the save format that is set manually (NO in Step #5), the encoding processing portion corresponding to the save format selected by the user on the input screen G3 or the input screen G6 displayed on the display portion 9 in Step #3 performs the encoding processing on the image data (Step #9). The file creating portion 42 then extracts the image data after the encoding processing, and creates a data file of the image data thus extracted (Step #10).

In a case where the control portion 35 (ACS portion 36) determines in Step #2 that the image made up of the original image data is a color image (NO in Step #2), the first encoding processing portion 37 performs the encoding processing according to the JPEG compression method on the image data forming the color image (Step #11), and the file creating portion 42 creates a data file of the image data after the encoding processing (Step #12).

As has been described, it is configured in such a manner that, as is shown in FIG. 4, the display control portion 39 displays images determined as being monochrome images by the ACS portion 36 in the form of a list in the input screen G2 on the display portion 9 and the input acceptance portion 40 enables the user to specify a desired monochrome image among the monochrome images shown in the list for specifying the save format. It thus becomes possible to swiftly select the save format (encoding processing) for the desired monochrome image. The convenience of the complex machine 1 can be therefore enhanced.

Also, as are shown in FIG. 5 and FIG. 8, it is configured in such a manner that an instruction to set the save format automatically by the complex machine 1 can be inputted by operating (pushing or touching) the buttons 108 and 116 on the input screens G3 and G6, respectively. Accordingly, for example, in a case where it is difficult for the user to determine whether it is suitable to save a monochrome image in the save format corresponding to the encoding processing by the JPEG compression method or in the save format corresponding to the encoding processing by the MMR compression method, the user can leave the determination to the complex machine 1 by operating the button 108 or 116. The convenience of the complex machine 1 can be thus enhanced further.

Also, when the user inputs an instruction to automatically set the save format by the complex machine 1 using, for example, the button 108 or 116, a data volume of the image data obtained by performing the encoding processing by the MMR compression method and a data volume of the image data obtained by performing the encoding processing by the JPEG compression method are compared. When a data volume of the image data obtained by performing the encoding processing by the MMR compression method is equal to or larger than a data volume of the image data obtained by performing the encoding processing by the JPEG compression method, a data file of the image data obtained by performing the encoring processing by the JPEG compression method is created. Hence, a volume of the file (file size) of the monochrome image can be equal to or smaller than a volume by creating a data file of the image data after the encoding processing by the MMR compression method.

Also, when a data volume of the image data obtained by performing the encoding processing by the MMR compression method is smaller than a data volume of the image data obtained by performing the encoding processing by the JPEG compression method, a data file of the image data obtained by performing the encoding processing by the MMR compression method is created. Hence, in a case where encoding processing is to be performed on the image data forming a monochrome image, the encoding processing by the MMR compression method, which is suitable as the encoding processing in this case, is adopted and suitable encoding processing can be performed.

As a result of the foregoing, in a case where the image subject to processing is a monochrome image and an instruction to automatically set the save format by the complex machine 1 is inputted, it becomes possible to make the file size smaller while avoiding or suppressing deterioration of the image quality to the least extent possible.

Instead of the embodiment above or in addition to the embodiment above, the invention can adopt the following modifications.

(1) The embodiment above is furnished with the capability of enabling a selection of the save format for the image data forming a monochrome image. In addition to this capability, a density setting portion furnished with the capability of setting and changing the image density of the monochrome image may be provided. When this configuration is provided, for example, in a case where a sheet of the document is coarse paper and the sheet is colored as a whole, it becomes possible to avoid a low quality image from being formed.

Figure 12:
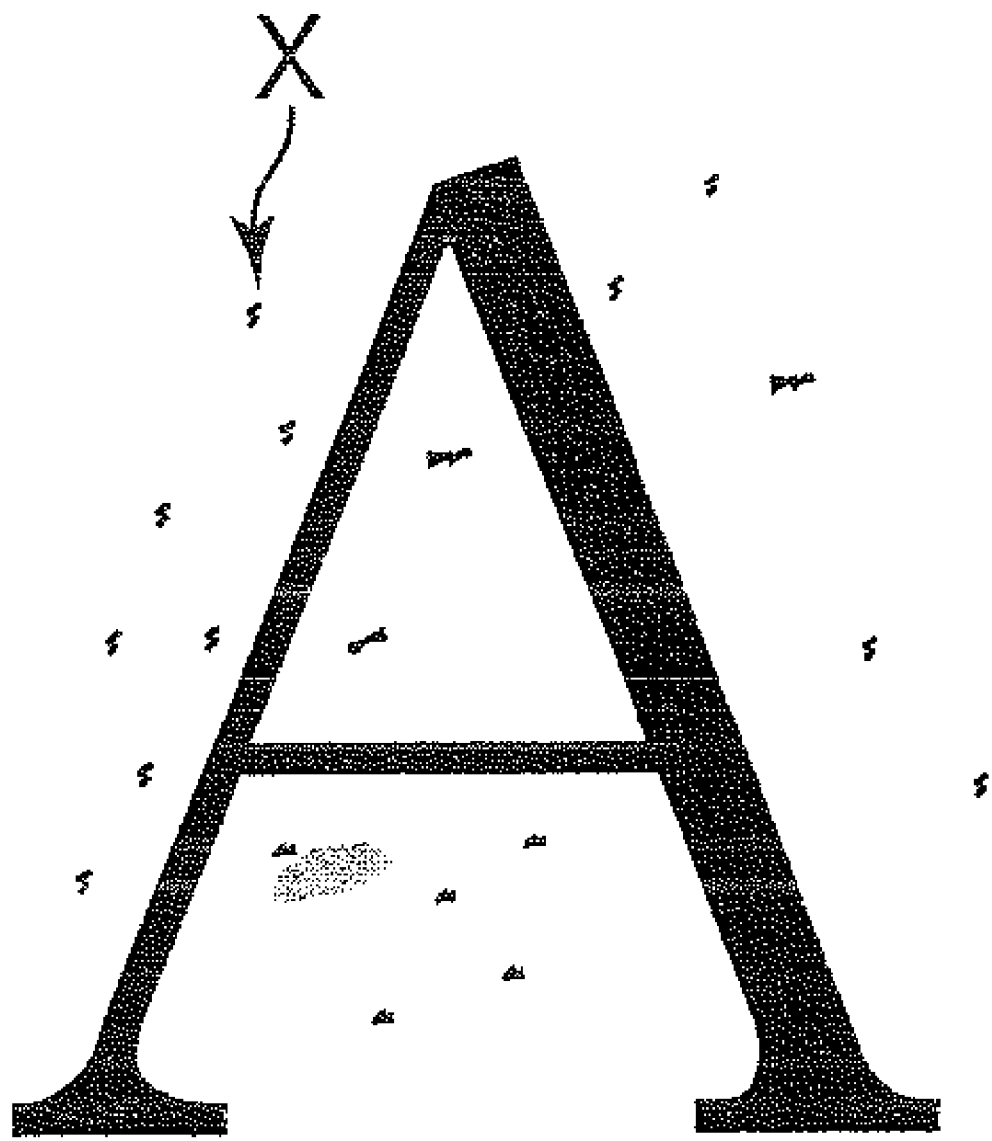
FIG. 12 is a view showing a state where noises unrelated to an image formed on a document are formed in the background portion.

More specifically, in a case where a document is a sheet colored as a whole and bearing a monochrome image, when encoding processing by the MMR compression method or encoding processing by the JPEG compression method is performed, as is indicated by a letter X in FIG. 12, so-called noises unrelated to an image formed on the document are formed on the background portion of a recording sheet in some cases. Accordingly, by providing the density setting portion having the capability of setting and changing the image density of the monochrome image and, for example, by lowering the image density of the monochrome image, the background portion can be whitened in a reliable manner. It thus becomes possible to avoid the low quality image as described above from being formed. The density setting portion can be achieved, for example, by running a predetermined program on the control portion 35.

Figure 14:
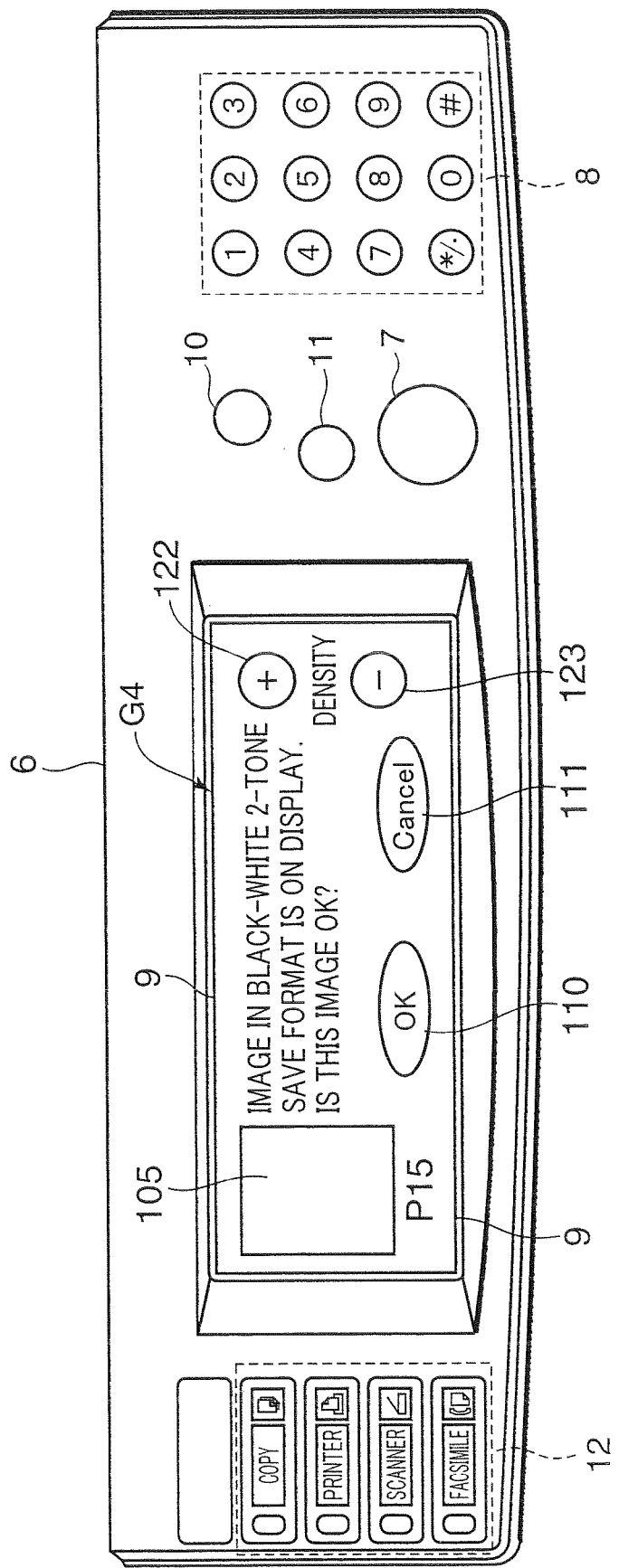
FIG. 14 is a view showing an example of the input screen for the user to make an input for setting the density of the image.

To be more concrete, for example, on the input screen G4 shown in FIG. 6, the display control portion 39 may display, as the input screen G4 shown in FIG. 14, a + (Plus) button 122 to accept an instruction to change the density of the monochrome image data compressed by the MMR compression method to be higher and a − (Minus) button 123 to accept an instruction to change the density of the monochrome image data compressed by the MMR compression method to be lower. In this case, the Plus button 122 and the Minus button 123 correspond to an example of a fourth button.

In a case where, for example, noises indicated by a letter X in FIG. 12 appear on a reduced image 105 of FIG. 14, an instruction to lower the image density is accepted at the input acceptance portion 40 as the user touches the Minus button 123. When the Plus button 122 is touched, the density setting portion changes the monochrome image data to be denser and when the Minus button 123 is touched, it changes the monochrome image data to be less dense.

To be more concrete, upon acceptance of an instruction to lower the image density at the input acceptance portion 40, the density setting portion lowers the density by lowering the density of the original image data before compression or the original image data restored by decoding (decompressing) the compressed image data by decreasing the pixel value of each pixel by a predetermined value. The density setting portion then has the image data at the changed density compressed by the first encoding processing portion 37. Accordingly, the display control portion 39 displays the reduced image 105 according to the compressed image data at changed density on the input screen G4. In this case, the reduced image 105 on the input screen G4 corresponds to an example of a confirmation image.

Upon acceptance of an instruction to increase the density at the input acceptance portion 40, too, the density of the original image data is changed to be higher by the density setting portion. The image data at the changed density is then compressed by the first encoding processing portion 37 and displayed as the reduced image 105.

Accordingly, because the user becomes able to confirm the result of the change in density using the Plus button 122 and the Minus button 123 from the reduced image 105, the image density can be readily set to obtain a satisfactory image.

(2) The first embodiment described a case where the JPEG compression method is used as a compression method for compressing multilevel image data exceeding binary image data and the JBIG compression method and the MMR compression method as a compression method for compressing the binary image data by way of example. The compression methods, however, are not limited to those specified above and other compression methods are also adoptable.

(3) In the processing shown in FIG. 11, whether the contents of the inputs on the input screens G1 through G8 are to set the save format automatically is determined first and thence suitable encoding processing is performed. The invention, however, is not limited to this configuration. For example, as is detailed in the flowchart of FIG. 13, at a stage before the input screens G1 through G8 are displayed, image data as the results of the encoding processing by the JPEG compression method and the encoding processing by the MMR compression method may be generated.

Figure 13:
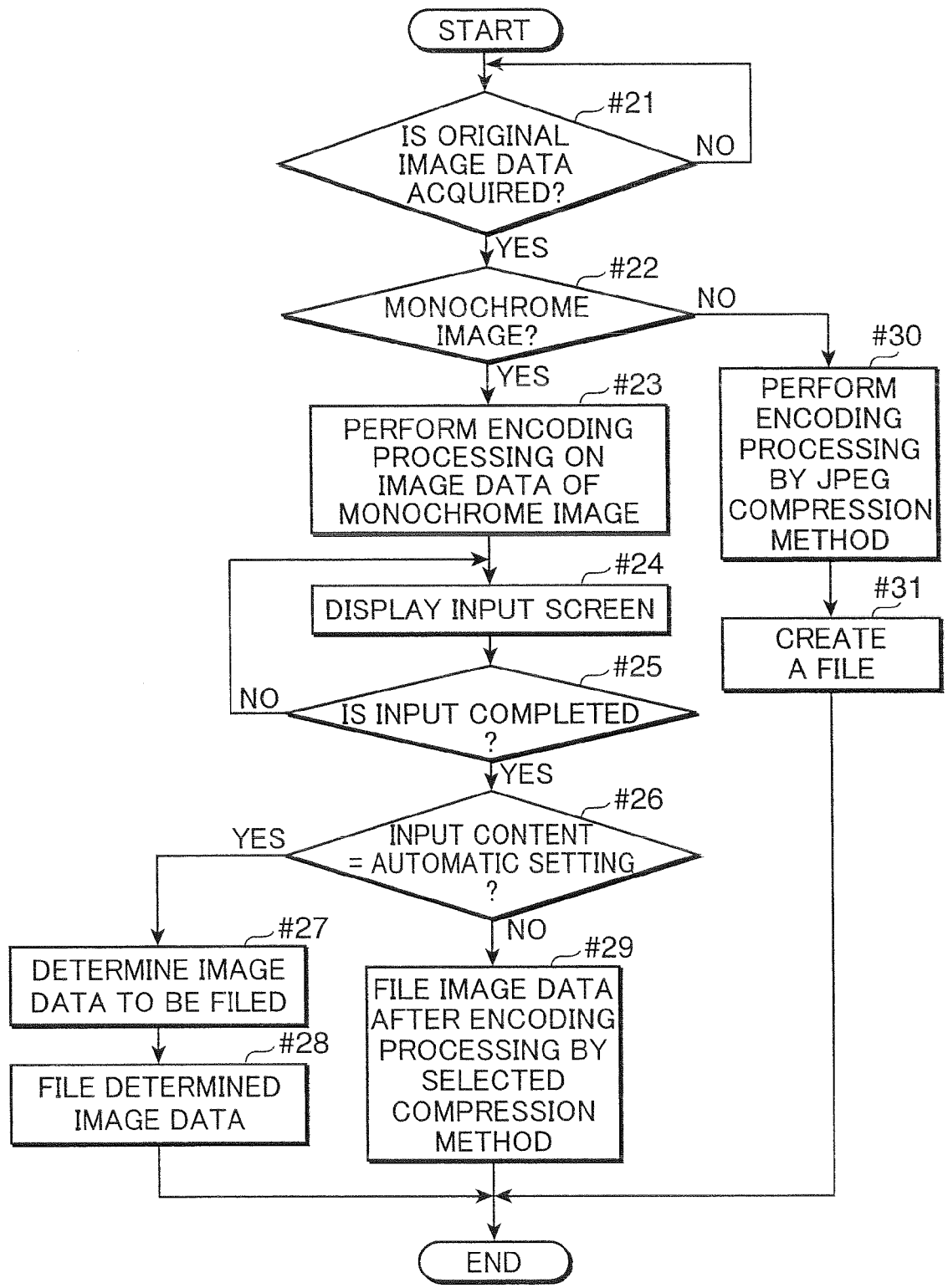
FIG. 13 is a view showing a flowchart of a modification of the processing relating to creation of a file of the image data by the control portion.

More specifically, as is shown in FIG. 13, upon acquisition of image data (original image data) obtained by a reading action of the document reading portion 4 (YES in Step #21), the control portion 35 (ACS portion 36) determines whether an image made up of the original image data is a monochrome image (Step #22). In a case where the control portion 35 (ACS portion 36) determines the image as being a monochrome image (YES in Step #22), the first encoding processing portion 37 performs the encoding processing according to the JPEG compression method on the image data forming the monochrome image and the second encoding processing portion 38 performs the encoding processing according to the MMR compression method on the image data (Step #23). The encoding processing according to the JPEG compression method and the encoding processing according to the MMR compression method may be performed simultaneously in parallel or in sequence (the encoding processing according to the MMR compression method is performed after the encoding processing by the JPEG compression method). The control portion 35 (display control portion 39) then displays the input screens G1 through G8 on the display portion 9 as needed and the input acceptance portion 40 accepts operation instructions from the user (Step #24).

When inputs on the input screens G1 through G8 are completed (YES in Step #25), the control portion 35 (input acceptance portion 40) determines whether the contents of the inputs are to set the save format automatically (Step #26). In a case where the contents of the inputs are to set the save format automatically (YES in Step #26), the control portion 35 (data volume comparing portion 41) compares a data volume of the image data after the encoding processing according to the JPEG compression method and a data volume of the image data after the encoding processing according to the MMR compression method both performed in Step #23 as to which data volume is larger than the other. The file creating portion 42 then determines the image data having the smaller data volume in the two types of image data as the image data to be filed according to the comparison result (Step #27) and creates a data file of the image data thus determined (Step #28).

Meanwhile, in a case where it is determined in Step #26 that the contents of the inputs are to set the save format manually (NO in Step #26), the file creating portion 42 extracts image data after the encoding processing corresponding to the save format selected by the user from the two types of image data after the encoding in Step #23 (Step #27) and creates a data file of the image data thus extracted (Step #29).

In a case where the control portion 35 (ACS portion 36) determines in Step #22 that the image made up of the original image data is a color image (NO in Step #22), the first encoding processing portion 37 performs encoding processing according to the JPEG compression method on the image data forming the color image (Step #30) and then the file creating portion 42 creates a data file of the image data after the encoding processing (Step #31).

(4) In the embodiment above, in a case where an image of a document of interest is determined as being a monochrome image by the ACS processing and the contents of the inputs on the input screens G1 through G8 are to automatically set the save format, which of the encoding processing by the JPEG compression method or the encoding processing by the MMR compression method is to be performed on the image data of the image is selected automatically. In the invention, however, the subject of the encoding processing is not limited to the image data in a case where the image of the document of interest is determined as being a monochrome image by the ACS processing. It may be configured in such a manner that in a case where the image data is saved in the complex machine 1 as the monochrome image data, which of the encoding processing by the JPEG compression method or the encoding processing by the MMR compression method is to be performed on the image data is selected automatically.

(5) Applications of the invention are not limited to a complex machine and the invention is also applicable to an image reading device, such as a scanner.

More specifically, an image processing device according to one aspect of the invention includes: an input operation portion that is used to make an input for selecting encoding processing to be performed on an image to be filed as a monochrome image from first encoding processing according to a first compression method for compressing multilevel image data and second encoding processing according to a second compression method for compressing binary image data; an encoding processing portion that performs the encoding processing inputted from the input operation portion on the image upon input of the encoding processing to be performed on the image to be filed as the monochrome image from the input operation portion; and a file creating portion that creates a file of image data after the encoding processing by the encoding processing portion. The input operation portion includes a display portion and first and second input portions. The display portion displays a list display screen on which images to be filed as the monochrome image are shown in a form of a list. The first input portion is used to make an input for specifying a desired image among the images shown on the display portion. The display portion displays an input screen on which is made an input for selecting encoding processing to be performed on an image specified by the first input portion from the first and second encoding processing. The second input portion is used to make an input on the input screen for selecting one of the first and second encoding processing as the encoding processing to be performed on the image specified by the first input portion.

According to this configuration, the list display screen showing images to be filed as the monochrome image in the form of a list is displayed on the display portion so as to enable the user to make an input for specifying a desired image among the images shown on the list display screen. Hence, in comparison with a case where the list display screen is not displayed, the encoding processing to be performed on the desired image can be selected swiftly. It thus becomes possible to achieve an image processing device having high convenience.

Also, it is preferable to further include a determination portion that performs determination processing to determine whether an image made up of image data acquired by the image processing device is a monochrome image, so that the display portion displays the list display screen on which images determined as being the monochrome image by the determination portion are shown as the images to be filed as the monochrome image in a form of a list, and that the input operation portion is used make an input for selecting encoding processing to be performed on the image determined as being the monochrome image by the determination portion from the first and second encoding processing.

The image to be filed as the monochrome image is an image determined as being a monochrome image using a determination capability of determining whether an image made up of image data obtained by the image processing device is a monochrome image as described above when this determination capability is furnished to the image processing device. In this case, it is preferable that the display portion functions to display the list display screen showing images determined as being the monochrome image by the determination portion in the form of a list as the images to be filed as the monochrome image, and that the input operation portion functions to make an input for selecting the encoding processing to be performed on the image determined as being the monochrome image by the determination portion from the first and second encoding processing.

Also, the determination processing may be ACS processing.

Also, it is preferable that: the display portion includes a touch panel that accepts information which represents an image displayed at a touched position when a display screen thereof is touched; the list display screen is used as the first input portion; and the input operation portion accepts an image represented by the information accepted at the touch panel as the image specified by the first input portion when the information represents any one of the images included in the list display screen.

According to this configuration, the user is able to specify a desired image by touching the desired image among the images included in the list display screen. The ease of operation when specifying an image can be thus improved.

Also, upon acceptance of the image specified by the first input portion, the display portion displays the image specified, a first button indicating Black-White-Gray, and a second button indicating Black-White 2-Tone; the first button and the second button are used as the second input portion; and the input operation portion accepts a selection of the first encoding processing when the information accepted at the touch panel represents the first button, and accepts a selection of the second encoding processing when the information represents the second button.

According to this configuration, when the user specifies an image subject to processing, the specified image is displayed on the display portion and the first button indicating Black-White-Gray and the second button indicating Black-White 2-Tone are displayed on the same screen at the same time. When the first button is touched, the input operation portion accepts a selection of the first encoding processing for compressing multilevel image data, and when the second button is touched, it accepts a selection of the second encoding processing for compressing binary image data. In this case, the first and second buttons do not indicate the types of encoding processing that a user who lacks expert knowledge cannot understand, but they are displayed as buttons indicating the characteristics, such as Black-White-Gray and Black-White 2-Tone, that are easy for general users to understand. The ease of operation by general users can be thus improved. In addition, because the image specified as the subject to processing as well as the first and second buttons are displayed on the same screen, the user is able to operate the first and second buttons while confirming the characteristic of the specified image. Consequently, it becomes easier for the user to select the button that suits the characteristic of the image. When the button that suits the characteristic of the image is selected, the encoding processing suitable to the characteristic of the image is selected.

Also, it is preferable that: the encoding processing portion includes a first encoding processing portion that performs the first encoding processing on the image data forming the image to be filed as the monochrome image and a second encoding processing portion that performs the second encoding processing on the image data forming the image to be filed as the monochrome image; the input operation portion further includes a third input portion used to make an input of an instruction to make the image processing device perform selection processing to select the encoding processing to be performed on an image specified among the images shown on the display portion from the first encoding processing and the second encoding processing; the image processing device further includes a selection processing portion that performs, upon input of the instruction from the third input portion, the selection processing to select the encoding processing to be performed on the image specified by the first input portion from the first encoding processing and the second encoding processing.

According to this configuration, the image processing device further includes the third input portion used to input an instruction for making the image processing device perform the selection processing to select the encoding processing to be performed on the image specified among the images shown on the display portion from the first encoding processing and the second encoding processing. Hence, for example, in a case where it is difficult for the user to determine whether it is suitable to perform the first encoding processing or the second encoding processing on the images displayed on the display portion, the user can leave the determination to the image processing device. It thus becomes possible to achieve an image processing device having further higher convenience.

Also, it is preferable that: the display portion includes a touch panel that accepts information which represents an image displayed at a touched position when a display screen thereof is touched, and displays, upon acceptance of a specification of any image among the images included in the list display screen at the first input portion, the image specified, a first button indicating Black-White-Gray, a second button indicating Black-White 2-Tone, and a third button indicating that the selection processing is performed automatically; the first button and the second button are used as the second input portion; the third button is used as the third input portion; and the input operation portion accepts a selection of the first encoding processing when the information accepted at the touch panel represents the first button, a selection of the second encoding processing when the information represents the second button, and makes the selection processing portion perform the selection processing when the information represents the third button.

According to this configuration, when the user specifies an image subject to processing, the specified image is displayed on the display portion and the first button indicating Black-White-Gray, the second button indicating Black-White 2-Tone, and the third button indicating that the type of encoding processing is selected automatically are also displayed on the same screen. In this case, because the image specified as the subject to processing as well as the first, second, and third buttons are displayed on the same screen, it becomes easier for the user to select encoding processing that suits the characteristic of the image while operating the first and second buttons by confirming the characteristic of the specified image. In addition, in a case where it is difficult to determined whether the characteristic of the image is Black-White-Gray or Black-White 2-Tone, the user can leave the selection of encoding processing that suits the image to the image processing device by operating the third button. It thus becomes possible to achieve an image processing device having further higher convenience.

Also, the selection processing portion includes a data volume comparing portion that performs, given that a data volume of image data after the first encoding processing by the first encoding processing portion is a first data volume and one of a data volume of image data after the second encoding processing by the second encoding processing portion and a data volume relating to this data volume is a second data volume, comparing processing to compare the first data volume and the second data volume as to which data volume is larger than the other, and the selection processing portion selects the first encoding processing by the first encoding processing portion when the data volume comparing portion determines that the first data volume is smaller than the second data volume, and selects the second encoding processing by the second encoding processing portion when the data volume comparing portion determines that the second data volume is smaller than the first data volume.

According to this configuration, in a case where an instruction to make the image processing device perform processing to select one of the first encoding processing and the second processing is inputted by the third input portion, a concrete configuration to automatically perform the selection processing can be achieved.

In addition, in a case where the selection processing is performed automatically, effects as follow scan be achieved. That is, in a case where encoding processing is performed on the image data forming a monochrome image, the second encoding processing for compressing binary image data is more suitable than the first encoding processing for compressing multilevel image data. However, in a case where a data volume of the image data after the first encoding processing is smaller than a data volume of the image data after the second encoding processing, creating a file of the image data after the first encoding processing can make a volume of the file (file size) of the monochrome image smaller than by creating a file of the image data after the second encoding processing.

Meanwhile, in a case where a data volume of the image data after the second encoding processing is smaller than a data volume of the image data after the first encoding processing, when encoding processing is to be performed on the image data forming a monochrome image, the second encoding processing, which is suitable as the encoding processing in this case, is adopted.

Accordingly, in a case where the image is a monochrome image, it is possible to make a volume of a file (file size) when creating a file of the image smaller while avoiding or suppressing deterioration of the image quality of this image to the least extent possible.

Also, it is preferable that the input operation portion includes a density setting portion that sets density of the image to be filed as the monochrome image.

When configured in this manner, because the image processing device further includes the density setting portion that sets the density of the image to be filed as the monochrome image, the user becomes able to set not only the type of encoding processing but also the density of the image.

Also, it is preferable that the display portion includes a touch panel that accepts information represented by an image displayed at a touched position when a display screen thereof is touched, and upon acceptance of a selection of the encoding processing to be performed on the image specified by the first input portion at the second input portion, displays a confirmation image, which is obtained by performing the encoding processing that has been selected on the image specified by the first input portion, and a fourth button that accepts a setting of the density of the image; the density setting portion changes the density of image data of the image specified by the first input portion in response to the setting of the density accepted at the fourth button when the information accepted at the touch panel represents the fourth button; and the display portion displays, as the confirmation image, an image obtained by performing the encoding processing that has been selected on the image data at changed density when the density of the image data is changed by the density setting portion.

According to this configuration, when the user selects the encoding processing using the second input portion, a confirmation image, which is obtained by performing the encoding processing that has been selected on the image specified by the user using the first input portion, is displayed. It thus becomes easier for the user to confirm the result of the encoding processing. In addition, the confirmation image and the fourth button to accept the setting of the density of the image are displayed on the same screen and the density of the image data specified by the first input portion is changed in response to the setting of the density accepted at the fourth button. Moreover, an image obtained by performing the encoding processing that has been selected on the image data at the changed density is displayed as the confirmation image. The user thus becomes able to set the density of the image as needed while viewing the confirmation image. The convenience can be therefore improved.

Also, it is preferable that the first compression method is a JPEG compression method and the second compression method is an MMR compression method.

According to this configuration, the invention is particularly effective for a case where the first compression method is the JPEG compression method and the second compression method is the MMR compression method.

Also, an image reading device according to another aspect of the invention includes an image reading portion that reads an image of a document, and the image processing device described above. The image processing device creates a file of image data obtained by a reading action of the image reading portion.

According to this configuration, the functions of the image forming device described above can be obtained in the image reading device.

This application is based on Japanese Patent application serial No. 2007-333042 filed in Japan Patent Office on Dec. 25, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing device, comprising:
an input operation portion that is used to make an input for selecting encoding processing to be performed on an image to be filed as a monochrome image from first encoding processing according to a first compression method for compressing multilevel image data and second encoding processing according to a second compression method for compressing binary image data;
an encoding processing portion that performs the encoding processing inputted from the input operation portion on the image upon input of the encoding processing to be performed on the image to be filed as the monochrome image from the input operation portion; and
a file creating portion that creates a file of image data after the encoding processing by the encoding processing portion,
wherein:
the input operation portion includes a display portion and first and second input portions;
the display portion displays a list display screen on which images to be filed as the monochrome image are shown in a form of a list;
the first input portion is used to make an input for specifying a desired image among the images shown on the display portion;
the display portion displays an input screen on which is made an input for selecting encoding processing to be performed on an image specified by the first input portion from the first and second encoding processing; and
the second input portion is used to make an input on the input screen for selecting one of the first and second encoding processing as the encoding processing to be performed on the image specified by the first input portion.

2. The image processing device according to claim 1, further comprising:
a determination portion that performs determination processing to determine whether an image made up of image data acquired by the image processing device is a monochrome image,
wherein:
the display portion displays the list display screen on which images determined as being the monochrome image by the determination portion are shown as the images to be filed as the monochrome image in a form of a list; and the input operation portion is used make an input for selecting encoding processing to be performed on the image determined as being the monochrome image by the determination portion from the first and second encoding processing.

3. The image processing device according to claim 2, wherein:

the determination processing is ACS processing.

4. The image processing device according to claim 2, wherein:

the encoding processing portion includes a first encoding processing portion that performs the first encoding processing on the image data forming the image to be filed as the monochrome image and a second encoding processing portion that performs the second encoding processing on the image data forming the image to be filed as the monochrome image;

the input operation portion further includes a third input portion used to make an input of an instruction to make the image processing device perform selection processing to select the encoding processing to be performed on an image specified among the images shown on the display portion from the first encoding processing and the second encoding processing; and the image processing device further comprises a selection processing portion that performs, upon input of the instruction from the third input portion, the selection processing to select the encoding processing to be performed on the image specified by the first input portion from the first encoding processing and the second encoring processing.

5. The image processing device according to claim 4, wherein:

the display portion includes a touch panel that accepts information which represents an image displayed at a touched position when a display screen thereof is touched, and displays, upon acceptance of a specification of any image among the images included in the list display screen at the first input portion, the image specified, a first button indicating Black-White-Gray, a second button indicating Black-White 2-Tone, and a third button indicating that the selection processing is performed automatically;

the first button and the second button are used as the second input portion;

the third button is used as the third input portion; and the input operation portion accepts a selection of the first encoding processing when the information accepted at the touch panel represents the first button, a selection of the second encoding processing when the information represents the second button, and makes the selection processing portion perform the selection processing when the information represents the third button.

6. The image processing device according to claim 4, wherein:

the selection processing portion includes a data volume comparing portion that performs, given that a data volume of image data after the first encoding processing by the first encoding processing portion is a first data volume and one of a data volume of image data after the second encoding processing by the second encoding processing portion and a data volume relating to this data volume is a second data volume, comparing processing to compare the first data volume and the second data volume as to which data volume is larger than the other; and the selection processing portion selects the first encoding processing by the first encoding processing portion when the data volume comparing portion determines that the first data volume is smaller than the second data volume, and selects the second encoding processing by the second encoding processing portion when the data volume comparing portion determines that the second data volume is smaller than the first data volume.

7. The image processing device according to claim 1, wherein:

the display portion includes a touch panel that accepts information which represents an image displayed at a touched position when a display screen thereof is touched;

the list display screen is used as the first input portion; and the input operation portion accepts an image represented by the information accepted at the touch panel as the image specified by the first input portion when the information represents any one the images included in the list display screen.

8. The image processing device according to claim 7, wherein:

upon acceptance of the image specified by the first input portion, the display portion displays the image specified, a first button indicating Black-White-Gray, and a second button indicating Black-White 2-Tone;

the first button and the second button are used as the second input portion; and the input operation portion accepts a selection of the first encoding processing when the information accepted at the touch panel represents the first button, and accepts a selection of the second encoding processing when the information represents the second button.

9. The image processing device according to claim 1, wherein:

the input operation portion includes a density setting portion that sets density of the image to be filed as the monochrome image.

10. The image processing device according to claim 9, wherein:

the display portion includes a touch panel that accepts information represented by an image displayed at a touched position when a display screen thereof is touched, and upon acceptance of a selection of the encoding processing to be performed on the image specified by the first input portion at the second input portion, displays a confirmation image, which is obtained by performing the encoding processing that has been selected on the image specified by the first input portion, and a fourth button that accepts a setting of the density of the image;

the density setting portion changes the density of image data of the image specified by the first input portion in response to the setting of the density accepted at the fourth button when the information accepted at the touch panel represents the fourth button; and the display portion displays, as the confirmation image, an image obtained by performing the encoding processing that has been selected on the image data at changed density when the density of the image data is changed by the density setting portion.

11. The image processing device according to claim 1, wherein:
the first compression method is a JPEG compression method and the second compression method is an MMR compression method.

12. The image processing device according to claim 1, wherein:
the encoding processing portion includes a first encoding processing portion that performs the first encoding processing on the image data forming the image to be filed as the monochrome image and a second encoding processing portion that performs the second encoding processing on the image data forming the image to be filed as the monochrome image;
the input operation portion further includes a third input portion used to make an input of an instruction to make the image processing device perform selection processing to select the encoding processing to be performed on an image specified among the images shown on the display portion from the first encoding processing and the second encoding processing; and
the image processing device further comprises a selection processing portion that performs, upon input of the instruction from the third input portion, the selection processing to select the encoding processing to be performed on the image specified by the first input portion from the first encoding processing and the second encoring processing.

13. The image processing device according to claim 12, wherein:
the selection processing portion includes a data volume comparing portion that performs, given that a data volume of image data after the first encoding processing by the first encoding processing is a first data volume and one of a data volume of image data after the second encoding processing by the second encoding processing portion and a data volume relating to this data volume is a second data volume, comparing processing to compare the first data volume and the second data volume as to which data volume is larger than the other; and
the selection processing portion selects the first encoding processing by the first encoding processing portion when the data volume comparing portion determines that the first data volume is smaller than the second data volume, and selects the second encoding processing by the second encoding processing portion when the data volume comparing portion determines that the second data volume is smaller than the first data volume.

14. An image reading device, comprising:
an image reading portion that reads an image of a document; and
the image processing device set forth in claim 1,
wherein the image processing device creates a file of image data obtained by a reading action of the image reading portion.

* * * * *